United States Patent [19]

Willis

[11] 4,132,565

[45] Jan. 2, 1979

[54] ACCELERATOR FOR GYPSUM SLURRY

[75] Inventor: Wilfred E. Willis, Rancocas, N.J.

[73] Assignee: Kaiser Cement & Gypsum Corporation, Oakland, Calif.

[21] Appl. No.: 847,224

[22] Filed: Oct. 31, 1977

[51] Int. Cl.$^2$ .............................................. C04B 11/00
[52] U.S. Cl. .................................... 106/315; 106/109
[58] Field of Search ................ 106/315, 110, 314, 109

[56] References Cited

U.S. PATENT DOCUMENTS

| 2,078,198 | 4/1937 | King | 106/315 |
|---|---|---|---|
| 3,573,947 | 4/1971 | Kinkade et al. | 106/114 |
| 3,870,538 | 3/1975 | Burkard et al. | 106/315 |
| 4,019,920 | 4/1977 | Burkard et al. | 106/114 |
| 4,059,456 | 11/1977 | DeRooy et al. | 106/315 |

*Primary Examiner*—Winston A. Douglas
*Assistant Examiner*—J. V. Howard
*Attorney, Agent, or Firm*—Naylor, Neal & Uilkema

[57] ABSTRACT

An improved accelerator is produced by impact and ball mill grinding gypsum board so that gypsum particles have size of less than one micron in diameter, in the absence of an additive to inhibit calcination.

4 Claims, No Drawings

ACCELERATOR FOR GYPSUM SLURRY

BACKGROUND OF THE INVENTION

The purpose and function of an accelerator for hemihydrate gypsum is described at length in U.S. Pat. Nos. 3,262,799 and 3,573,947. These patents describe the highlights in the history of using land plaster and rehydrated gypsum accelerators and use of sugar as an anti-calcination agent. U.S. Pat. No. 3,314,613 and 3,337,191 disclose preparation of an accelerator from gypsum board by impact grinding.

SUMMARY OF THE INVENTION

I have discovered that a fully satisfactory and highly desirable gypsum hemihydrate accelerator can be produced by impact and ball mill grinding gypsum so that gypsum particles have fineness on the order of less than one micron in diameter without the necessity of incorporating an anti-calcination agent in the grinding mixture. I have also discovered that when ground gypsum board is used instead of land plaster, ground gypsum board does not cake and plug up the ball mill as land plaster does, and also that at this degree of fineness the fibrous appearance of the fibers of the gypsum face papers disappears and the ground gypsum board ceases to be difficult to handle.

The essential object of the present invention is to provide an improved accelerator for hemihydrated gypsum which consists essentially of gypsum board ground to a fineness on the order of one micron.

DESCRIPTION OF THE INVENTION

The preferred starting material is gypsum board, i.e. waste or cull gypsum board, or end trim from gypsum board, or gypsum board itself. The material is first ground up in an impact mill to about 100 mesh particle size. It is then reground for approximately two hours in a ball mill to the point where the average particle size is one micron in diameter or smaller.

When the gypsum board material is ground in the hammer mill only, it has a B.E.T. (Brunauer, Emmett and Teller) surface area of 13,000 sq. cm/gram and an equivalent average particle size of 4.6 microns. After a further grinding for about two hours in the laboratory size ball mill, the material has a B.E.T. surface area of approximately 130,000 and an equivalent average particle size of 0.46 microns. At the end of the ball mill grinding operation, the material is ready for use as an accelerator. It is added directly to hemihydrate gypsum or a slurry of hemihydrate gypsum. B.E.T. test procedure is described in the Journal of American Chemical Society 59,1553 (1937); 60,309 (1938); and 62,1723 (1940).

One gram of subject impact and ball milled gypsum board accelerator mixed with 200 grams of hemihydrate gypsum and 192 cc of water and agitated for 10 seconds at high speed in a Waring blender resulted in a setting time of 3 minutes after a ball mill grinding time of 1.5 hours. At the end of the impact milling and prior to ball mill grinding, one gram (regular accelerator) produced a setting time of 6 minutes.

The following data is furnished from gypsum plant trial runs:

| | Control before Test Run | early in Test Run | late in Test Run | Control after Test Run |
|---|---|---|---|---|
| Type of Accelerator | Regular | Subject | Subject | Regular |
| Accelerator usage, lbs./MSF | 26 | 3.7 | 4.48 | 26 |
| Board dry weight, lbs./MSF | 1870 | 1760 | 1815 | 1850 |
| Weight corrected to caliper | 1885 | 1756 | 1845 | 1865 |
| Thickness, ins. | .496 | .501 | .492 | .496 |
| Board moisture, % | 5-15 | 5-15 | 5-15 | 5-15 |
| Bond, dry, % | | | | |
| Face | 100 | 100 | 100 | 100 |
| Back | 100 | 100 | 100 | 100 |
| Bond, High Humid, % | | | | |
| Face | 100 | 98 | 100 | 100 |
| Back | 98 | 96 | 99 | 98 |
| Flexural strengths: | | | | |
| Dry, across, lbs. | 145.5 | 146 | 150.5 | 143.5 |
| Deflection, ins. | .49 | .48 | .47 | .44 |
| at Hi Humid, across, lbs. | 99.5 | 95.5 | 102.5 | 100 |
| Deflection, in. | .71 | .70 | .68 | .67 |
| Dry, parallel, lbs. | 50.5 | 49 | 51.5 | 57 |
| Deflection, in. | .39 | .35 | .25 | .25 |
| at Hi Humid, parallel, lbs. | 37.5 | 33 | 35 | 40 |
| Deflection, in. | .85 | 1.0 | 1.0 | .9 |
| Twist failure, ins. | | | | |
| Face | 3/8 | 15/8 | 2/8 | 0 |
| Back | 1/8 | 16/8 | 3/8 | 5/8 |
| Punch, lbs. | | | | |
| Dry | 830 | 647 | 817 | 828 |
| Hi Humid | 565 | 427 | 553 | 560 |
| Nail Pull through, lbs. | | | | |
| Dry | 146 | 123 | 146 | 136.5 |
| Hi Humid | 111.5 | 81.5 | 121.5 | 107.5 |
| Field Hardness (Hunter), lbs. | | | | |
| Dry | 17.1 | 13.4 | 16.5 | 15.9 |
| Hi Humid | 11.6 | 10.1 | 12.1 | 13.1 |
| A.S.T.M. C-473 Tests: | | | | |
| Core hardness, lbs. | | | | |
| Dry | 35.5 | 29.5 | 40 | 36 |
| Hi Humid | 31.3 | 21.6 | 27 | 27 |
| End hardness, lbs. | | | | |
| Dry | 33.3 | 28.8 | 36.7 | 38.3 |
| Hi Humid | 26.8 | 23.7 | 28.3 | 32.2 |
| Edge hardness, lbs. | | | | |
| Dry | 34.6 | 29.3 | 39.8 | 40.3 |
| Hi Humid | 27.2 | 21.7 | 28.5 | 30 |

| CORE SLURRY TESTS | With Regular Accelerator After test run |
|---|---|
| Wet density, lbs/cu.ft. | 66.0 |
| Dry density, lbs/cu.ft. | 47.8 |
| Dry Compressive Strength, psi | 629 |
| Slurry setting time, Vicat, sec. | 160 |

| | With Subject Accelerator | |
|---|---|---|
| | One-third of way through test run | Two-thirds of way through test run |
| Wet density, lbs/cu.ft. | 63.8 | 64.3 |
| Dry density, lbs/cu.ft. | 44.9 | 44.0 |
| Dry compressive strength, psi | 693 | 694 |
| Slurry setting time, Vicat, sec. | 120 | 150 |

| ACCELERATOR EFFICIENCY TEST | (Machine mix set with 200 g hemihydrate gypsum) | |
|---|---|---|
| Regular Accelerator | 5 grams yielded | 180 sec. set time |
| Subject Accelerator | 1 gram yielded | 230 sec. set time |

It will be seen that the dry compressive strengths of cubes taken when the subject accelerator of the invention was in use were increased by 10% over cubes taken just after the test run. At the same time, the cube density was decreased by 7.5%. Taken together, these two factors indicate a significant increase in strength.

The regular accelerator referred to in the test data is the material as it is at the end of the impact mill treatment, i.e. prior to any ball mill grinding.

What is claimed is:

1. A process for producing an accelerator for hemihydrate gypsum comprising comminuting gypsum board to a particle size of about 100 mesh, and thereafter fine-grinding the resulting comminuted material in a ball mill to have an average particle size of about 1 micron and to have a specific surface area of about 100,000–130,000 square centimeters per gram.

2. The process of claim 1, said gypsum board including the face papers thereof.

3. An accelerator for hemihydrate gypsum consisting essentially of ground gypsum board having an average particle size of about 1 micron and having a specific surface area of about 100,000–130,000 square centimeters per gram.

4. The accelerator of claim 3, said gypsum board including the face papers thereof.

* * * * *